US012737381B2

(12) United States Patent
Dompe Gamboa et al.

(10) Patent No.: US 12,737,381 B2
(45) Date of Patent: Sep. 15, 2026

(54) DATABASE SYNCHRONIZATION BASED ON MEMORY TRANSFER

(71) Applicant: Hewlett Packard Enterprise Development LP, Spring, TX (US)

(72) Inventors: Diego A. Dompe Gamboa, San Jose (CR); Matthew Aaron Blanford, Roseville, CA (US); Rodolfo José Piedra Camacho, Cartago (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/113,264

(22) Filed: Feb. 23, 2023

(65) Prior Publication Data

US 2024/0289349 A1 Aug. 29, 2024

(51) Int. Cl.
*G06F 16/27* (2019.01)
*G06F 3/06* (2006.01)

(52) U.S. Cl.
CPC ............ *G06F 16/27* (2019.01); *G06F 3/0611* (2013.01); *G06F 3/064* (2013.01); *G06F 3/067* (2013.01)

(58) Field of Classification Search
CPC ........ G06F 16/27; G06F 3/0611; G06F 3/064; G06F 3/067
See application file for complete search history.

(56) References Cited

U.S. PATENT DOCUMENTS 6,073,140 A * 6/2000 Morgan .................. G06F 16/23 707/999.203
6,721,735 B1 * 4/2004 Lee ....................... G06F 16/275 707/999.005
9,298,935 B1 * 3/2016 Kumar .................... H04L 63/00
11,360,918 B1 * 6/2022 Wroblewski .............. G06F 9/52
2010/0241770 A1 * 9/2010 Tumblin ............... G06F 3/0656 710/52
2017/0052723 A1 * 2/2017 Voigt ........................ G06F 9/06
2018/0013579 A1 * 1/2018 Fairweather .............. G06F 8/76
2018/0121099 A1 * 5/2018 Vaquero Gonzalez ...................... G06F 16/27

(Continued)

OTHER PUBLICATIONS

Li et al., "KV-Direct: High-Performance In-Memory Key-Value Store with Programmable NIC", ACM, 2017, 16 Pages.

*Primary Examiner* — Sanjiv Shah
*Assistant Examiner* — Brooks T Hale
(74) *Attorney, Agent, or Firm* — Hewlett Packard Enterprise Patent Department

(57) ABSTRACT

A system for memory-transfer-based database synchronization in an appliance is provided. During operation, the system can receive, from a database manager on an active unit, a notification indicating that a first memory block has been updated due to an update to a first entry in a first database of the active unit. The system can identify a second memory block that stores a corresponding second entry in a second database of a standby unit. The first and second memory blocks can be in first and second memory segments, respectively, of respective memory devices of active and standby devices. The first and second memory segments can be outside of the accessible memory range of the respective operating systems. The system can then replace the content of the second memory block with the content of the first memory block using a memory-transfer operation, thereby synchronizing the first and second entries.

18 Claims, 10 Drawing Sheets

(56) References Cited

U.S. PATENT DOCUMENTS

| | | | | |
|---|---|---|---|---|
| 2018/0314570 | A1* | 11/2018 | Nazari | H04L 67/1001 |
| 2021/0258308 | A1* | 8/2021 | Avetisov | H04L 9/0825 |
| 2022/0179812 | A1* | 6/2022 | Lin | G06F 3/0619 |

* cited by examiner

DATABASE SYNCHRONIZATION BASED ON MEMORY TRANSFER

BACKGROUND

Field

The present disclosure relates to communication networks. More specifically, the present disclosure relates to a method and system for efficiently synchronizing database instances by transferring memory blocks.

BRIEF DESCRIPTION OF THE FIGURES

In the figures, like reference numerals refer to the same figure elements.

DETAILED DESCRIPTION

Figure 1A:
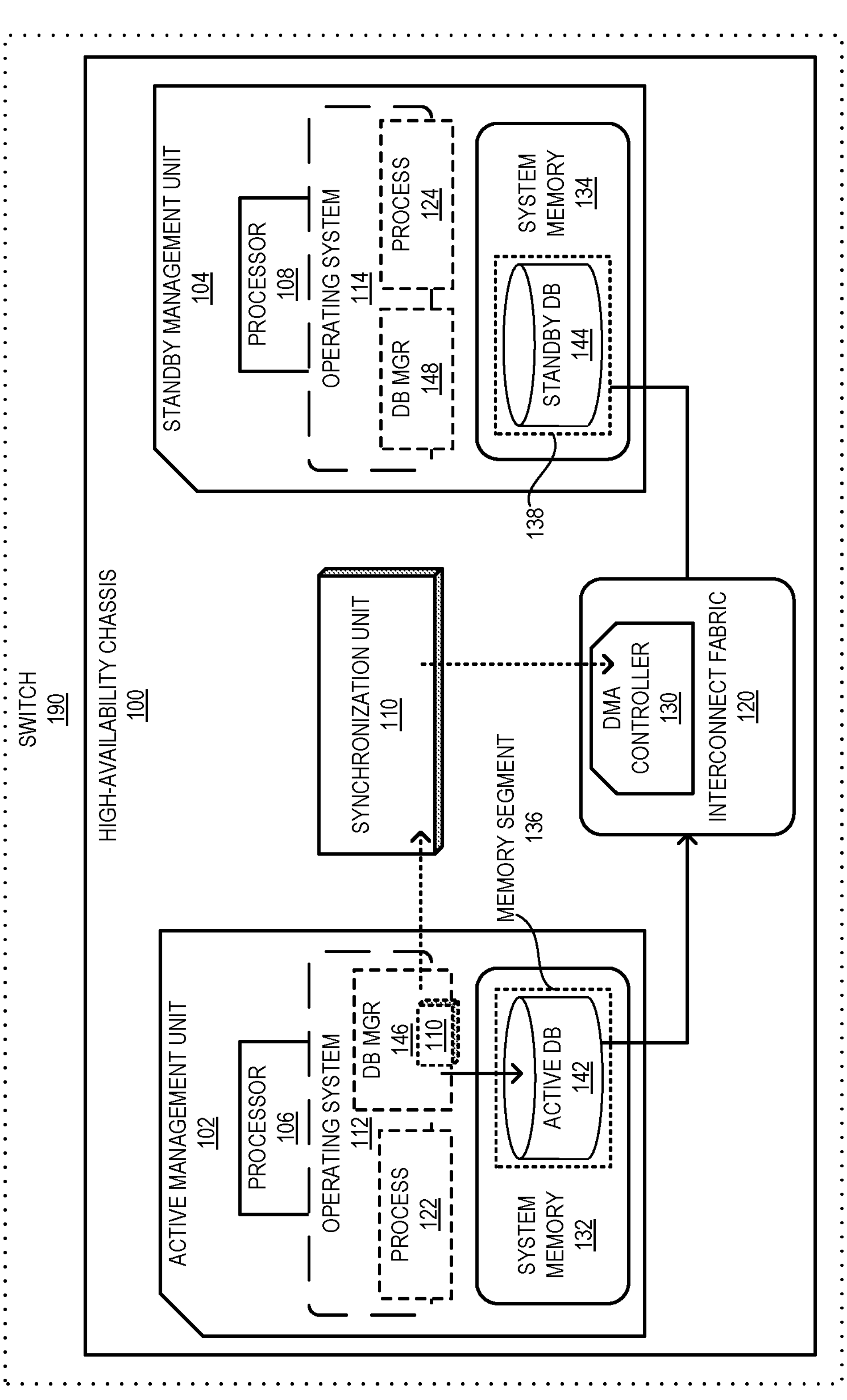
FIG. 1A illustrates an example of a high-availability chassis supporting memory-transfer-based database synchronization, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought with them an increasing traffic demand. As a result, equipment vendors race to build switches with versatile capabilities. To do so, a switch may incorporate expandable hardware and support different protocols and services to run on the hardware. Such hardware can provide the hardware foundation for a composable networking infrastructure. The chassis of the switch can include a set of backplane interfaces (e.g., slots) to support pluggable units, each of which can be attachable to a corresponding backplane interface. The chassis of the switch can include an interconnect fabric, such as a Peripheral Component Interconnect Express (PCIe) fabric, for facilitating interconnection among the units.

Operations of some of the units, such as a management unit, of the switch can be essential for the operability of the switch in a network. The management unit can manage the switch's resources (e.g., power distribution) and may monitor a respective component of the switch (e.g., other installed units). Hence, the management unit may require high availability, which indicates that if the management unit becomes unavailable, another standby unit can take over its operations. These management units can be referred to as active and standby management units (AMU and SMU), respectively. The chassis of the switch can then facilitate the failover to the SMU based on the interconnect fabric. Such a chassis can be referred to as a high-availability chassis. To ensure high availability, the respective database instances storing the states (e.g., software states) of the AMU and SMU need to be synchronized so that the SMU can take over in the event of a failure at the AMU.

The aspects described herein solve the problem of efficiently synchronizing respective database instances of the AMU and SMU by (i) maintaining the database instances in respective memory segments outside of the scope of the respective operating systems; (ii) if a record in the database is updated, identifying updated memory blocks in the memory segment of the active management unit; and (iii) transferring the updated memory blocks from the AMU to the SMU via the interconnect fabric. Here, the transfer includes replacing the corresponding memory blocks in the memory segment of the SMU with the updated memory blocks. In this way, the synchronization operation can be performed based on memory transfer, thereby avoiding resource-intensive application-layer synchronization.

With existing technologies, the synchronization between database instances of the AMU and SMU is performed by the active and standby database managers, respectively. A process that may require high availability can run an active instance on the AMU and a standby instance on the SMU. During operation, the active instance of the process, or the active process, can store state information in the active database instance, or the active database, running on the AMU. The state information can be represented by the values of a set of parameters. If the database is an in-memory key-value-store (memkvs), the active database manager (e.g., a memkvs daemon) can generate a record (or entry) in the active database. The record can include the state information and be stored in association with a key (e.g., a hash value) generated from the value. In this way, the record can be represented by a (key, value) pair.

To synchronize the state information, the active database manager can send the parameters to the standby database manager on the SMU. The active database manager can establish a network connection (e.g., via a network socket) with the standby database manager to send the parameters. The standby database manager can then generate a corresponding record in the standby database instance, or the standby database, running on the SMU. Subsequently, if the state information changes, the active process can issue an update command with the updated parameters. The active database manager can obtain the updated parameters and update the record. The active database manager can then send the updated parameters to the standby database manager, which can then update the corresponding entry in the standby database.

Typically, the active and standby database managers can operate as applications or daemons on the operating systems of the AMU and SMU, respectively. Hence, the synchronization operation may require extensive processing resources, such as instruction (or fetch-execute) cycles on respective processors. Furthermore, due to the data abstraction provided by the databases, the database managers may not consider the resource utilization caused by the synchronization operation. In addition, the communication between the active and standby database managers can be based on communication sockets. Hence, the synchronization operation may also require network resources. As a result, when the synchronization is performed at the application level, the latency (or delay) in the synchronization process can be significant. In addition, because the software stacks on the operating system can be unpredictable, the synchronization process can incur jitters. Consequently, a respective execution of the synchronization operation between the active and standby databases can be latency-prone and resource-intensive. Such an in efficient mode of synchronization can be unsuitable for high-performance operations.

To solve this problem, the synchronization operation can be performed by transferring an updated memory block from the AMU and replacing the corresponding target memory block at the SMU with the transferred memory blocks. To facilitate the memory-transfer-based synchronization, the respective system memories of the AMU and SMU can include memory segments that are not accessible (or visible) by the operating systems of the AMU and SMU, respectively. In other words, the memory segments can be outside of the accessible memory range of the operating systems of the AMU and SMU, respectively. As a result, the operating system cannot allocate or release a memory block (e.g., perform a malloc( ) operation) in the memory segments. The active and standby databases can then be stored in corresponding memory segments of the AMU and SMU, respectively.

The active database manager can track which memory block is updated (i.e., becomes "dirty") due to a change to the active database. The change can be caused by a transaction that includes an update to or an insertion of a record. When the transaction is complete, the active database manager can notify a synchronization unit identifying the dirty block. The synchronization unit can be included in the active database manager or a specialized processor of the chassis. The processor can be an Advanced RISC (a reduced instruction set computer) Machine (ARM) processor residing outside of the AMU and SMU. As a result, even if the AMU suffers a failure during the synchronization process, the synchronization unit can continue with the synchronization. The synchronization unit can then use direct memory access (DMA) to copy the updated memory block to the target memory location in the memory segment of the SMU.

The target memory location can correspond to the target memory block storing the same portion of the standby database. As result, if the updated memory block replaces the target memory block, the active and standby databases can become synchronized. To use DMA for the memory transfer, the synchronization unit may provide the memory locations of the updated and target memory blocks, respectively, to the DMA controller of the chassis. These memory locations can be referred to as the source and target memory locations, respectively. The DMA controller can then transfer the content of the updated memory block to the target memory block. Because the memory transfer is performed using the DMA, the active and standby databases can be synchronized without using the operating systems and associated processing resourcing on the AMU and SMU. The resultant synchronization process can then operate with low latency and can be predictable (e.g., less prone to jitters). Therefore, the memory-transfer-based synchronization process can support high-performance operations.

To facilitate the efficient transfer of the updated memory block, the respective memory segments of the AMU and SMU can be presented as a unified memory space (or as a flat memory) to the synchronization unit. From the perspective of the synchronization unit, the memory transfer operation is based on copying the memory content from the source location to the target location within the flat memory. Since the content of the active and standby databases are distributed among the memory blocks in the same way, the synchronization unit can determine the target memory location based on the source memory location and an offset. The offset can indicate can correspond to the size of the memory segment of the SMU. The flat memory structure can allow the synchronization unit to perform the memory transfer operation as a local memory copy operation, thereby performing the synchronization operation efficiently with low overhead.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "message" refers to a group of bits that can be transported together across a network. "Message" should not be interpreted as limiting examples of the present invention to a particular layer of a network protocol stack. "Message" can be replaced by other terminologies referring to a group of bits, such as "packet," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of a high-availability chassis supporting memory-transfer-based database synchronization, in accordance with an aspect of the present application. In this example, a switch 190 can house a high-availability chassis 100. Chassis 100 can support the backplane of switch 190. Switch 190 can support layer-2 and layer-3 communication. In some examples, switch 190 can be an Ethernet, InfiniBand, or other switch, and may use a corresponding communication protocol, such as Internet Protocol (IP), FibreChannel over Ethernet (FCOE), or other protocol. Switch 190 can be associated with a MAC address and an IP address. Switch 190 can also establish a tunnel with another tunnel endpoint. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). Switch 190 can determine routes by operating as a Border Gateway Protocol (BGP) peer.

Chassis 100 can include a set of backplane interfaces, such as PCIe slots, to support pluggable units, each of which can be attachable to a corresponding backplane interface. Chassis 100 include an interconnect fabric 120, such as a PCIe fabric, for facilitating interconnection among the units coupling chassis 100. Chassis 100 can support an AMU 102 and an SMU 104 coupled to each other via fabric 120. AMU 102 can include a processor 106 upon which operating system 112 may operate. AMU 102 can also maintain a database 142 (e.g., a memkvs) in system memory 132. AMU 102 can actively manage the resources of switch 190 and may monitor a respective component of switch 190, such as other units installed on chassis 100.

A process 122, which may run on operating system 112, may perform one or more operations on AMU 102. Process 122 can store the information associated with the operations in database 142 using a function call (e.g., an application programming interface (API) call). Database manager 146 can intercept the call and store the information in the corresponding memory location in memory 132. If database 142 (and database 144) is a memkvs instance, database 142 can be based on a dictionary data structure. A respective entry of database 142 can include a record comprising a (key, value) pair. The state information from process 122 can then be the value. The key (e.g., a hash value) generated from the value can be used to store and look up the value.

Chassis 100 can facilitate high availability to AMU 102 by allowing SMU 104 to detect the unavailability of AMU and in response, take over the operations of AMU 102. SMU 104 can include a processor 108 upon which operating system 114 may operate. SMU 104 can also maintain a database 144 in system memory 134. Database 144 can be the standby for database 142. Hence, database 144 can be a copy of database 142. Since process 122 may require high availability, process 124, which can be a standby instance of process 122, on SMU 104. To ensure that process 124 can perform the failover from AMU 102 and readily perform the operations of process 122, databases 142 and 144 need to be synchronized.

With existing technologies, the synchronization between databases 142 and 144 can be performed by active and standby database managers 146 and 148, respectively. When process 122 initiates a change to database 142, database manager 146 can perform the change on database 142 and initiate the synchronization operation. The change can include inserting a new piece of information into database 142 or updating an existing record in database 142. Database manager 146 can then send the information associated with the change to database manager 148. Database managers 146 and 148 can establish a network connection (e.g., via a network socket) between them for the synchronization operation. Database manager 148 can then perform the changes on database 144. In this way, databases 142 and 144 can remain synchronized.

Typically, database managers 146 and 148 can operate as applications or daemons on operating systems 112 and 122, respectively. Hence, the synchronization operation may require extensive processing resources, such as instruction cycles on processors 106 and 108 of AMU 102 and SMU 104, respectively. Furthermore, due to the data abstraction provided by databases 142 and 144, database managers 146 and 148 may not consider the resource utilization caused by the synchronization operation. In addition, the communication between database managers 146 and 148 can be based on communication sockets. Hence, the synchronization operation may also require network resources within chassis 100. As a result, when the synchronization is performed by database managers 146 and 148, the latency can be significant. In addition, because the software stacks on operating systems 112 and 114 can be unpredictable, the synchronization process can incur jitters. Consequently, a respective execution of the synchronization operation between databases 142 and 144 can be latency-prone and resource-intensive. Such an inefficient mode of synchronization can be unsuitable for high-performance operations on AMU 102 and SMU 104.

To solve this problem, the synchronization operation can be performed by transferring an updated memory block from memory 132 and replacing the corresponding target memory block in memory 134 with the transferred memory blocks. To facilitate the memory-transfer-based synchronization, memories 132 and 134 can include memory segments 136 and 138, respectively, that are not accessible (or visible) by operating systems 112 and 114, respectively. In other words, memory segments 136 and 138 can be outside of the accessible memory range of operating systems 112 and 114, respectively. As a result, operating systems 112 and 114 cannot allocate or release a memory block (e.g., perform a malloc( ) operation) in memory segments 136 and 138, respectively. Databases 142 and 144 can then be stored in memory segments 136 and 138, respectively. As a result, memory operations on databases 142 and 144 can be performed without involving operating systems 112 and 114.

Database manager 146 can track which memory block is updated (i.e., becomes "dirty") due to a change to database 142. The change can be caused by a transaction that includes an update to or an insertion of a record in database 142. When the transaction is complete, database manager 146 can notify a synchronization unit 110 identifying the dirty block. Synchronization unit 110 can be included in database manager 146. Alternatively, chassis 100 can include a specialized processor operating as synchronization unit 110. The processor can be an ARM processor residing outside of AMU 102 and SMU 104. As a result, even if AMU 102 suffers a failure during the synchronization process, synchronization unit 110 can continue with the synchronization process. The memory sharing between memory segments 136 and 138 via interconnect fabric 120 allows synchronization unit 110 to use DMA to copy the updated memory block of memory segment 136 to the target memory location in memory segment 138.

To use DMA for the memory transfer, synchronization unit 110 may provide the memory locations of the updated and target memory blocks, respectively, to DMA controller 130 of chassis 100. DMA controller 130 can then transfer the content of the updated memory block to the target memory block. Since databases 142 and 144 are stored in the memory range of memory segments 136 and 138, respectively, synchronization unit 110 can replicate the updated memory block into the corresponding memory location in memory segment 138 without the knowledge of the content. Since the updated and target memory blocks can store the corresponding portions of databases 142 and 144, when the updated memory block replaces the target memory block, databases 142 and 144 can become synchronized. Because the memory transfer is performed using DMA controller 130, databases 142 and 144 can be synchronized without using operating systems 112 and 114 and associated instruction cycles of processors 106 and 108, respectively. The resultant synchronization process can then operate with low latency within chassis 100 and can be predictable (e.g., less prone to jitters). Therefore, the memory-transfer-based synchronization process between AMU 102 and SMU 104 can support high-performance operations.

Figure 1B:
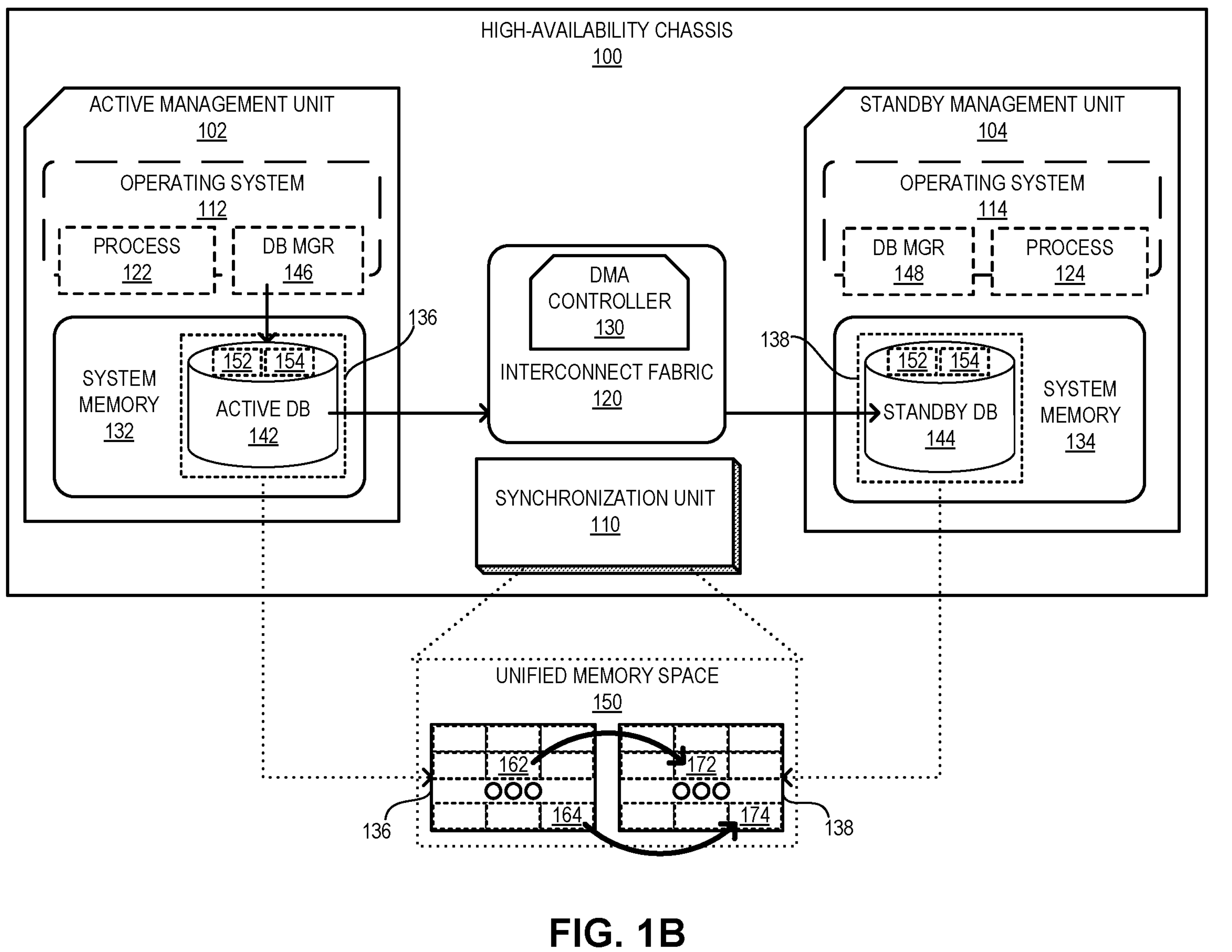
FIG. 1B illustrates an example of a unified memory space for facilitating memory-transfer-based database synchronization in a high-availability chassis, in accordance with an aspect of the present application.

FIG. 1B illustrates an example of a unified memory space for facilitating memory-transfer-based database synchronization in a high-availability chassis, in accordance with an aspect of the present application. To facilitate the efficient transfer of an updated memory block, memory segments 136 and 138 can be presented as a unified memory space 150 (or as a flat memory) to synchronization unit 110. From the perspective of synchronization unit 110, the memory transfer operation is based on copying the memory content from the source location to the target location within memory space 150. Accordingly, memory segments 136 and 138 can be represented as a unified and flat memory space 150.

The memory addresses of memory segments 136 and 138 can be transposed on memory space 150. For example, the memory addresses of memory segments 136 and 138 can be determined based on the flat memory addresses of memory space 150. In particular, if the initial addresses of memory segments 136 and 138 are known, a respective memory address for the memory blocks in memory space 150 can be converted to the corresponding physical address of memory segments 136 and 138. Since the content of databases 142 and 144 are distributed among the memory blocks in the same way, the content of the nth memory block in memory segments 136 and 138 can be the same.

Suppose that memory blocks 152 and 154 of memory segment 136 are updated. Database manager 146 can notify synchronization unit 110 identifying memory blocks 152 and 154. Synchronization unit 110 can determine that memory blocks 152 and 154 reside in memory locations (or addresses) 162 and 164 in memory space 150. Synchronization unit 110 can determine target memory locations 172 and 174 based on memory locations 162 and 164, respectively. Synchronization unit 110 can apply an offset to derive target memory locations 172 and 174. The offset can indicate the size of memory segment 138. For example, memory location (or address) 172 can be derived by adding the offset to memory location (or address) 162. Synchronization unit 110 can then instruct DMA controller 130 to perform the memory transfer.

The flat memory structure of memory space 150 can allow synchronization unit 110 to perform the memory transfer operation as a local memory copy operation. Even though the memory transfer operation is between memory locations 162 and 172, and between memory locations 164 and 174, because of the flat addressing, DMA controller 130 can identify the corresponding memory locations in memory segments 136 and 138. DMA controller 130 can then transfer memory blocks 162 and 164 from memory segment 136 to memory segment 138 via interconnect fabric 120. In this way, using memory space 150 and in conjunction with DMA controller 130, synchronization unit 110 can efficiently perform the synchronization operation with low overhead.

Figure 2:
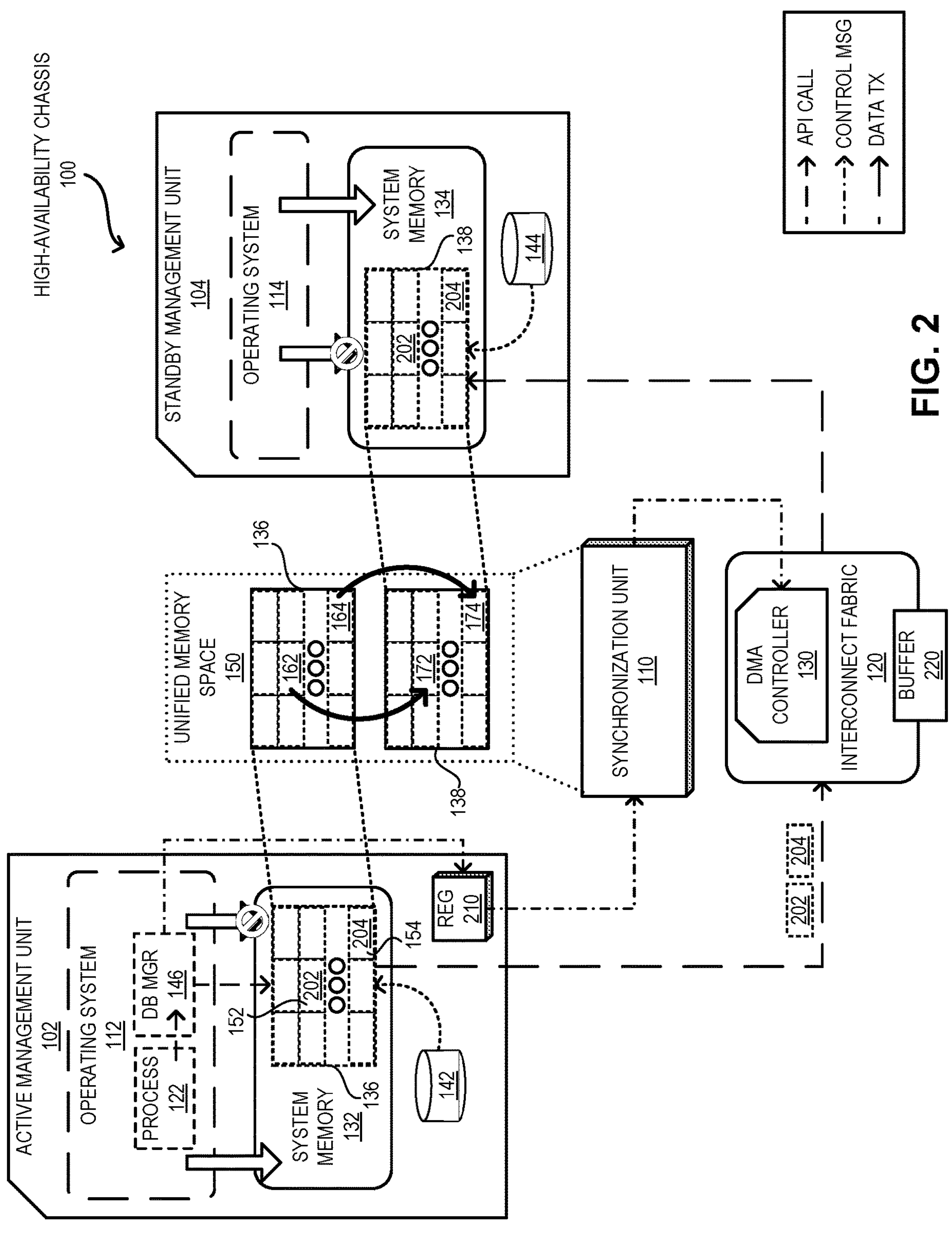
FIG. 2 illustrates an example of memory-transfer-based database synchronization in a high-availability chassis, in accordance with an aspect of the present application.

FIG. 2 illustrates an example of memory-transfer-based database synchronization in a high-availability chassis, in accordance with an aspect of the present application. Synchronization unit 110 can facilitate a passive replication process between memory segments 136 and 138 using DMA controller 130. The replication can be considered passive because synchronization unit 110 can facilitate the memory transfer for memory blocks 152 and 154 without considering the contents of memory blocks 152 and 154. Since the records of databases 142 and 144 are stored in the memory ranges of memory segments 136 and 138, synchronization unit 110 can replicate memory blocks 152 and 154 without knowledge of their content. Database manager 146 can track which memory blocks have been updated and perform the replication on the updated memory blocks.

During operation, process 122 can issue a transaction that changes memory blocks 152 and 154 to an API call. Suppose that the transaction results in content 202 and 204 for memory blocks 152 and 154, respectively. Database manager 146 can intercept the call and update memory blocks 152 and 154 with content 202 and 204, respectively. Database manager 146 can determine that memory blocks 152 and 154 are updated (or dirty). Subsequently, database manager 146 can notify synchronization unit 110 regarding the update. In some examples, AMU 102 can include a notification register 210 for facilitating the notification. When the transaction is complete, database manager 146 can store a value indicating a memory block that needs to be transferred (or replicated). For example, database manager 146 can store the memory location of memory block 152 in register 210.

Synchronization unit 110 can then determine that memory location 162 of memory block 152 in memory space 150. Synchronization unit 110 can also determine target memory location 172 in memory space 150. Based on an instruction from synchronization unit 110, DMA controller 130 can obtain content 202 from memory segment 136 and replicate it in memory segment 138, as indicated in memory space 150, via fabric 120. The instruction can be an interrupt issued by synchronization unit 110 to DMA controller 130. The instruction can also provide the starting memory address of memory location 162 and the number of bytes to be transferred (i.e., the size of memory block 152). Similarly, synchronization unit 110 can provide an instruction to transfer content 204 from memory location 164 to memory location 174.

Fabric 120 can include a buffer 220 for temporarily storing content 202 and 204 during the synchronization operation. For example, if fabric 120 is a PCIe fabric, buffer 220 can be a PCIe buffer capable of receiving and releasing data via PCIe interconnect. When DMA controller 130 retrieves content 202 from memory location 162, DMA controller 130 can store content 202 in buffer 220 and replicate content 202 at memory location 172 in memory segment 138. As a result, if AMU 102 becomes unavailable during the synchronization process, DMA controller 130 can still replicate content 202 in memory segment 138 from buffer 220. In the same way, when DMA controller 130 retrieves content 204 from memory location 164, DMA controller 130 can store content 204 in buffer 220 and replicate content 202 at memory location 174 in memory segment 138. Therefore, the length of buffer 220 can correspond to the size of at least one memory block.

Figure 3:
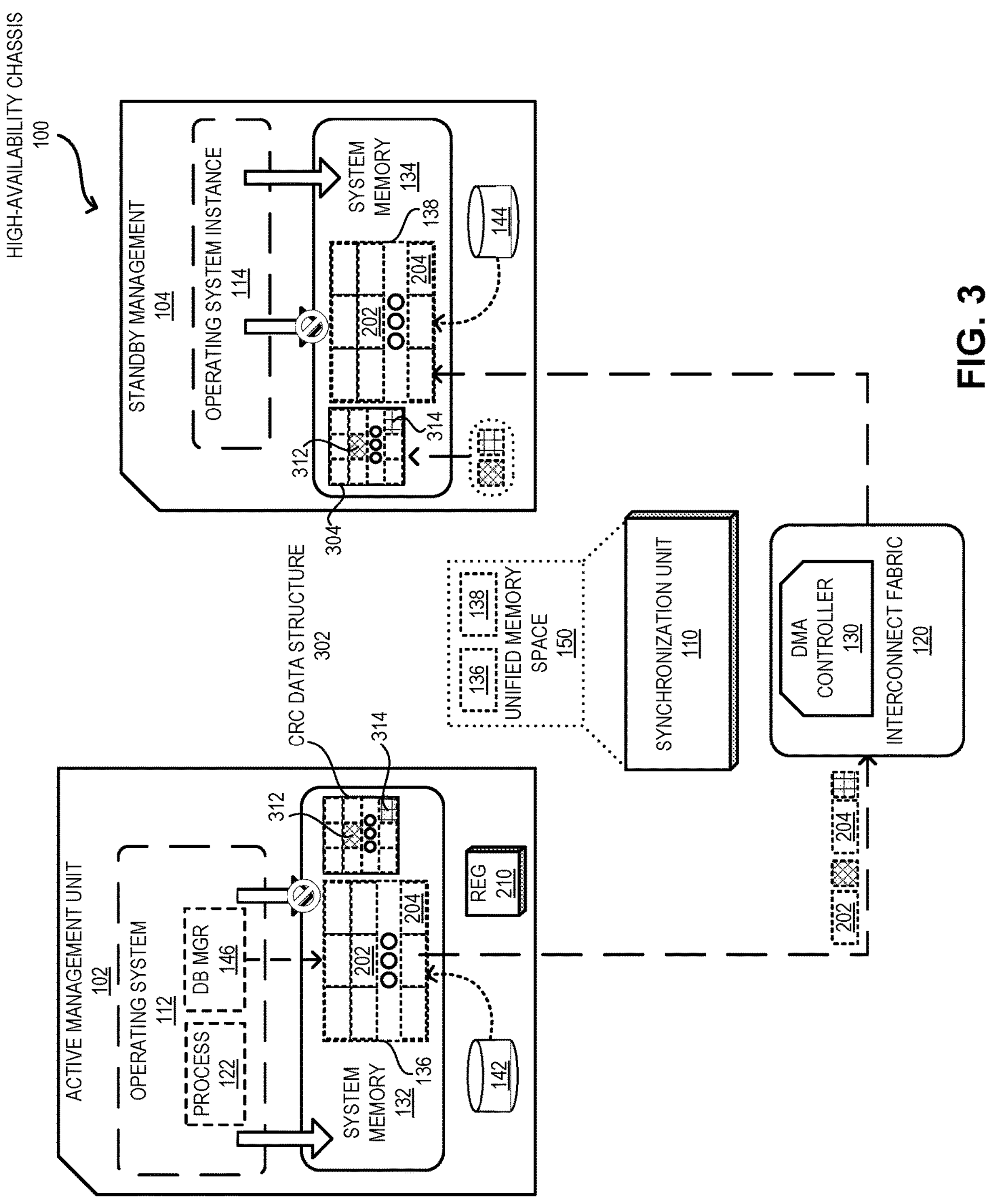
FIG. 3 illustrates an example of using error-detection codes for facilitating memory-transfer-based database synchronization in a high-availability chassis, in accordance with an aspect of the present application.

To ensure the validity of content 202 and 204, AMU 102 can provide respective error-detection codes, such as cyclic redundancy check (CRC) values, to SMU 104. FIG. 3 illustrates an example of using error-detection codes for facilitating memory-transfer-based database synchronization in a high-availability chassis, in accordance with an aspect of the present application. When database manager 146 determines that memory blocks 152 and 154 are updated, database manager 146 can calculate CRC values 312 and 314 of content 202 and 204, respectively. Database manager 146 can then store CRC values 312 and 314 in a CRC data structure 302 in association with memory blocks 152 and 154, respectively. Data structure 302 can be a journaling file system. Data structure 302 can then be referred to as a CRC journal 302.

When DMA controller 130 transfers content 202 and 204 to memory segment 138, CRC values 312 and 314, respectively, are also transferred to SMU 104 via fabric 120. Upon calculating CRC value 312, database manager 146 can notify synchronization unit 110 regarding the calculation of CRC value 312. Upon issuing an instruction to transfer content 202, synchronization unit 110 can issue another instruction (e.g., an interrupt) to DMA controller 130. The instruction can provide the memory location in data structure 302 that stores CRC value 312 and the number of bytes that represent CRC value 312. DMA controller 130 can then transfer CRC value 312 to SMU 104 and store it in data structure 304 in memory 134 of SMU 104. Here, data structures 302 and 304 can be the source and target CRC journals, respectively. The location storing CRC value 312 in data structure 304 can correspond to memory block 152 in memory segment 138. In the same way, upon transferring content 204, DMA controller 130 can transfer CRC value 314 to data structure 304.

Figure 4A:
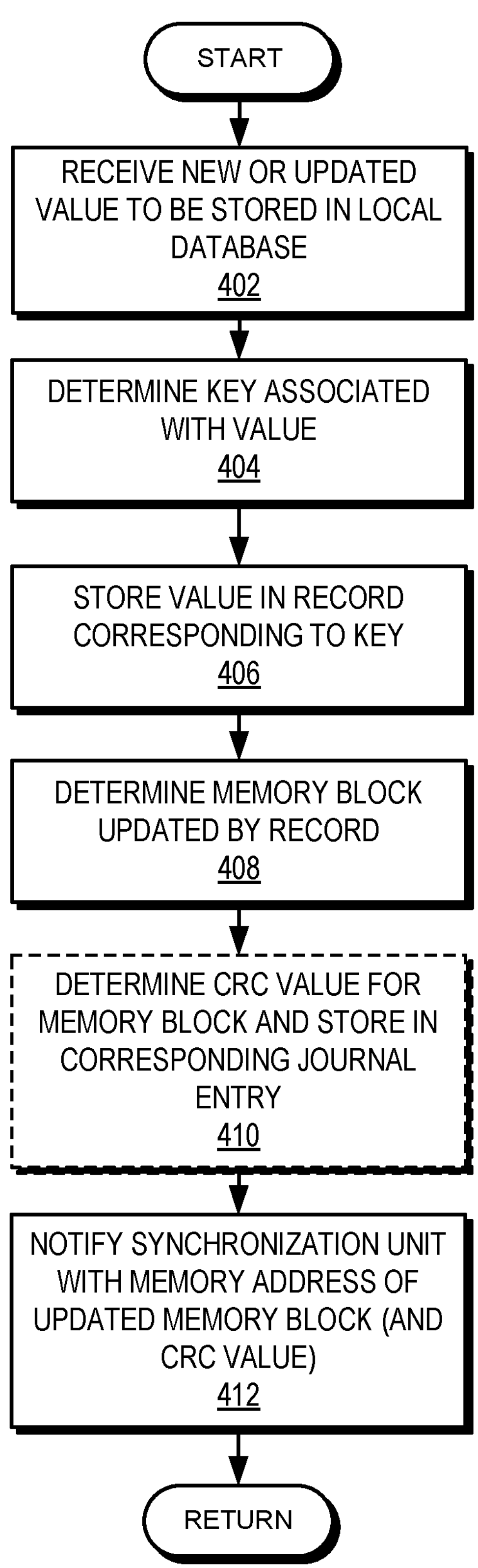
FIG. 4A presents a flowchart illustrating the process of an active database manager tracking an updated memory block of a database, in accordance with an aspect of the present application.

FIG. 4A presents a flowchart illustrating the process of an active database manager tracking an updated memory block of a database, in accordance with an aspect of the present application. During operation, the database manager can receive a new or updated value to be stored in the local database (operation 402). The database manager may receive the value via an API call from a process. The value can then be indicative of the state information associated with the process. The database manager can then determine a key (e.g., a hash value) associated with the value (operation 404) and store the value in a record corresponding to the key (operation 406).

The database manager can determine the memory block updated by the record (i.e., the memory block that stores the record) (operation 408). The database manager can, optionally (denoted with dashed lines), determine a CRC value for the memory block and store it in the corresponding journal entry (operation 410). The database manager can notify the synchronization unit with the memory address of the updated memory block (operation 412). If a CRC value is calculated for the memory block, the database manager can provide the CRC value to the synchronization unit as well.

Figure 4B:
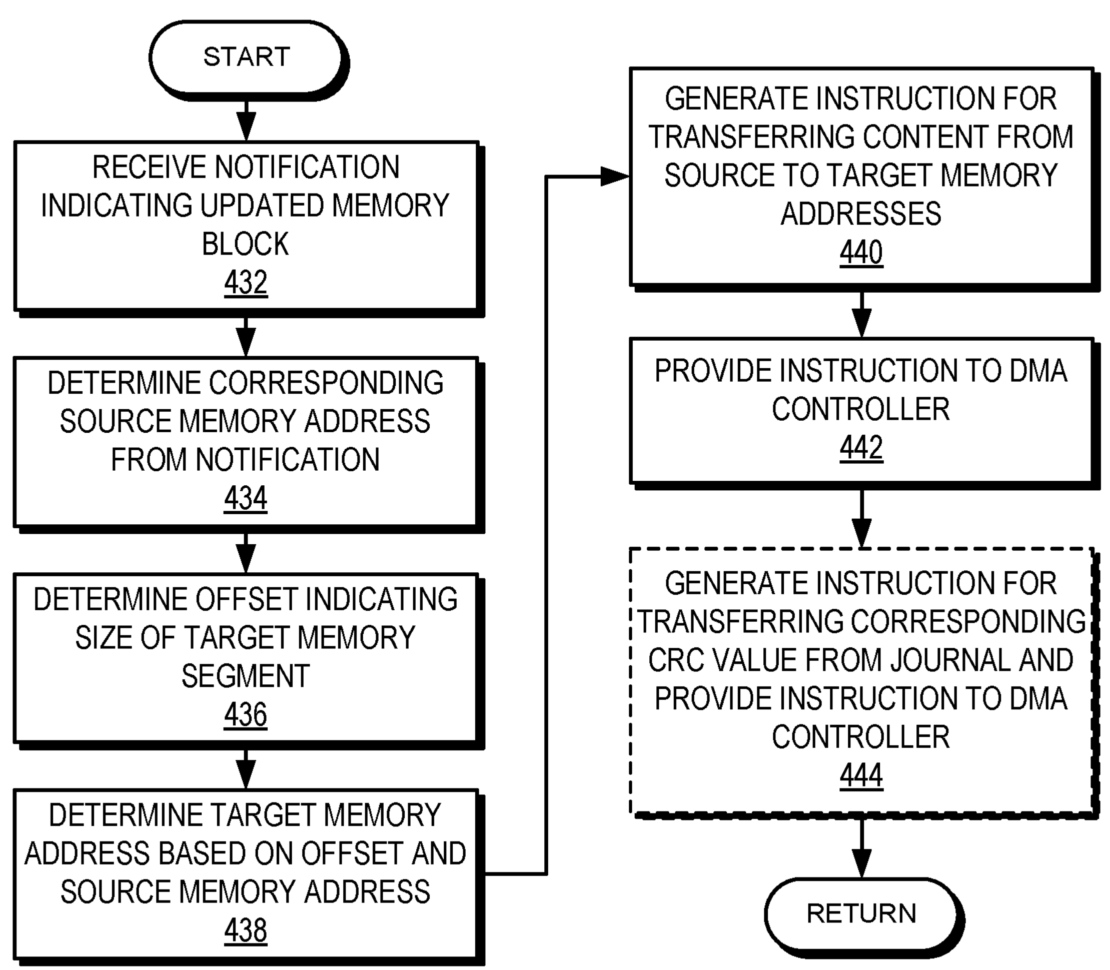
FIG. 4B presents a flowchart illustrating the process of a synchronization unit synchronizing an updated memory block of a database, in accordance with an aspect of the present application.

FIG. 4B presents a flowchart illustrating the process of a synchronization unit synchronizing an updated memory block of a database, in accordance with an aspect of the present application. During operation, the synchronization unit can receive a notification indicating an updated memory block (operation 432) and determine a corresponding source memory address (i.e., the address of the updated memory block) from the notification (operation 434). The synchronization unit can then determine an offset indicating the size of the target memory segment (operation 436). Subsequently, the synchronization unit can determine the target memory address based on the offset and the source memory address (operation 438).

The synchronization unit can generate an instruction for transferring content from the source to the target memory addresses (operation 440) and provide the instruction to the DMA controller (operation 442). If the interconnect is a PCIe interconnect, providing the instruction can include programming a set of PCIe registers indicating a memory block size and the source and target memory addresses. If a CRC value is computed for the memory block (denoted with dashed lines), the synchronization unit can also generate an instruction for transferring the corresponding CRC value from the journal and provide the instruction to the DMA controller (operation 444).

Figure 4C:
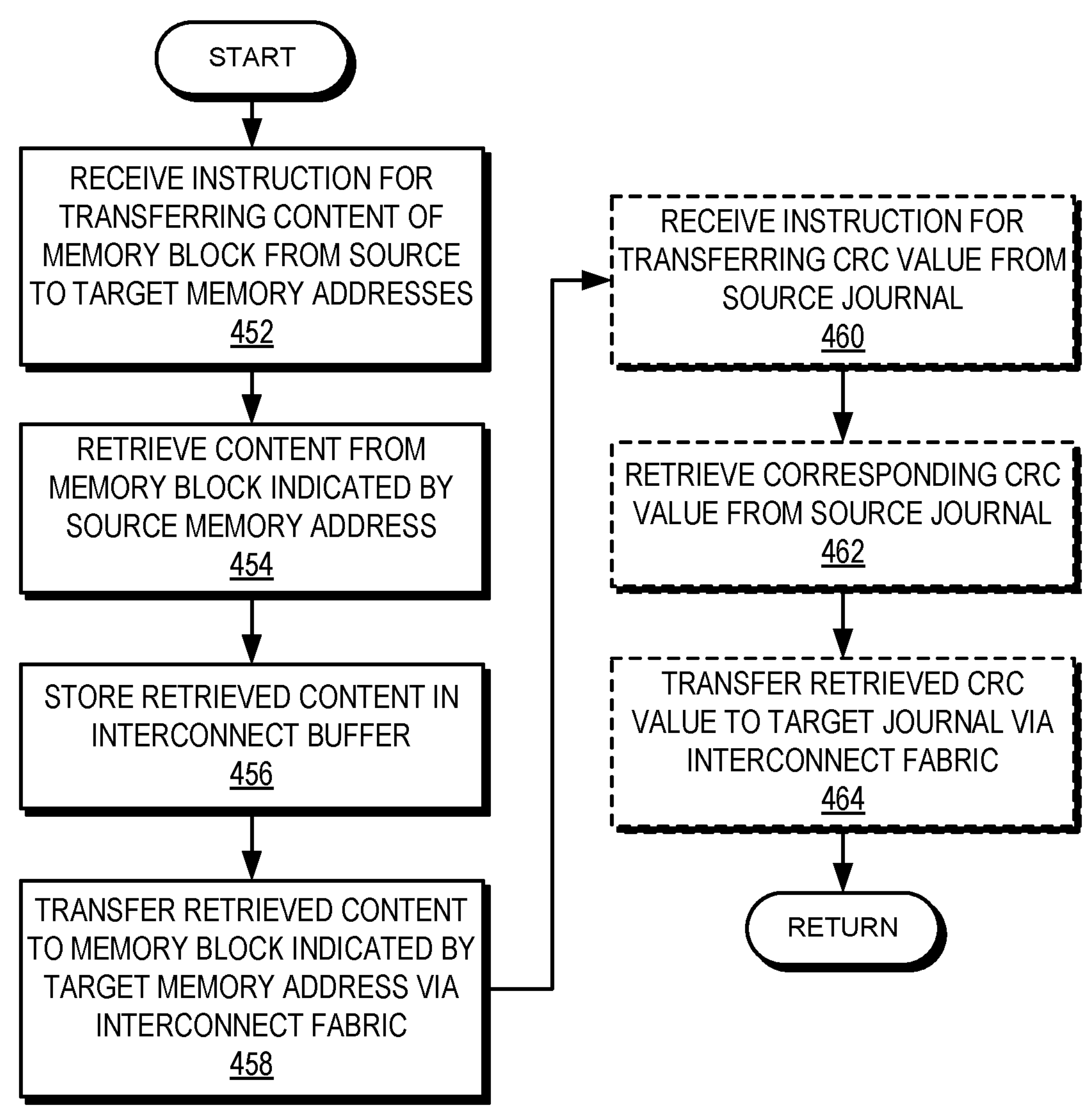
FIG. 4C presents a flowchart illustrating the process of a direct memory access (DMA) controller transferring an updated memory block of a database via an interconnect fabric, in accordance with an aspect of the present application.

FIG. 4C presents a flowchart illustrating the process of a DMA controller transferring an updated memory block of a database via an interconnect fabric, in accordance with an aspect of the present application. During operation, the DMA controller can receive an instruction for transferring the content of a memory block from the source to the destination addresses (operation 452). The DMA controller can then retrieve the content from the memory block indicated by the source memory address (operation 454). The DMA controller can store the retrieved content in an interconnect buffer (e.g., a PCIe buffer) (operation 456). As a result, if upon retrieval, the source memory block becomes unavailable, the DMA controller can still complete the transfer.

The DMA controller can then transfer the retrieved content to the memory block indicated by the target memory address via an interconnect fabric (operation 458). If a CRC value is computed for the source memory block (denoted with dashed lines), the DMA controller can also receive an instruction for transferring the CRC value from the source journal (operation 460). Subsequently, the DMA controller can retrieve the corresponding CRC value from the source journal (operation 462) and transfer the retrieved CRC value to the target journal via the interconnect fabric (operation 464).

Figure 5A:
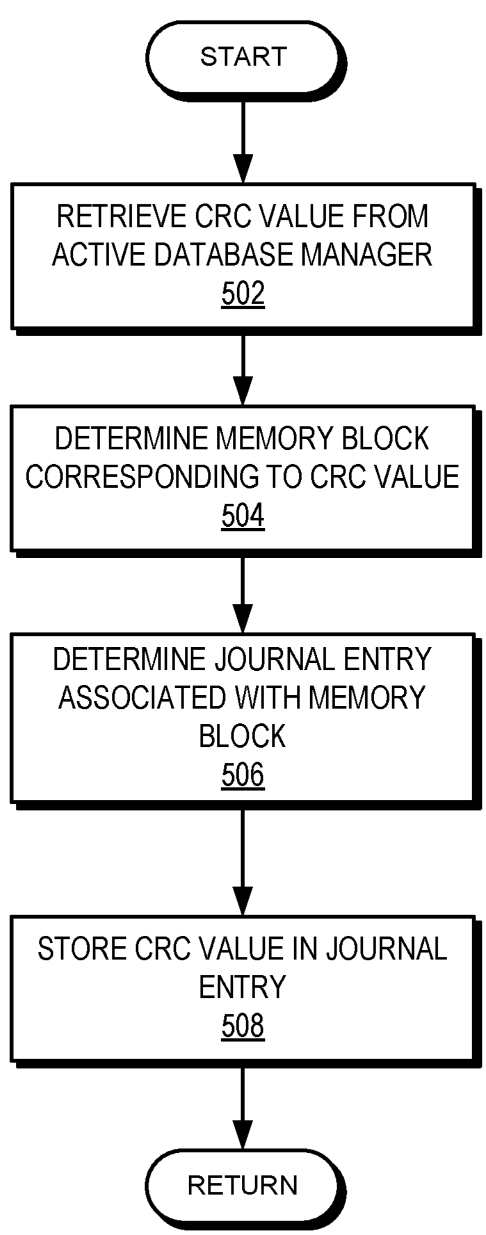
FIG. 5A presents a flowchart illustrating the process of a standby database manager storing an error-detection code associated with a transferred memory block, in accordance with an aspect of the present application.

Instead of the synchronization unit, the CRC value can also be exchanged between the active and standby database managers. FIG. 5A presents a flowchart illustrating the process of a standby database manager storing an error-detection code associated with a transferred memory block, in accordance with an aspect of the present application. During operation, the database manager can receive a CRC value from the active database manager (e.g., via a network socket or the interconnect fabric) (operation 502). The database manager can then determine a memory block corresponding to the CRC value (operation 504) and determine a journal entry associated with the memory block (operation 506). The database manager can then store the CRC value in the journal entry (operation 508).

Figure 5B:
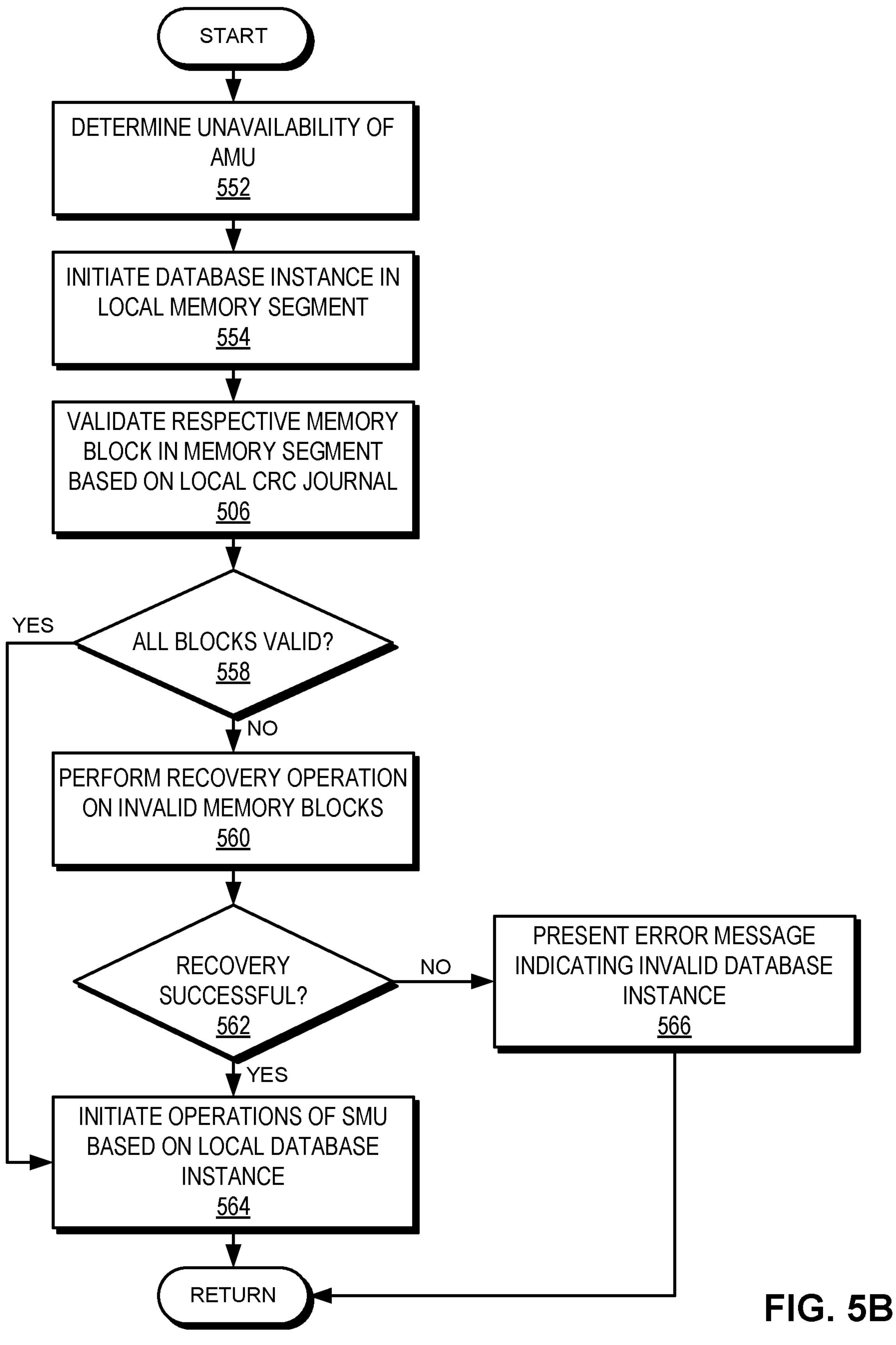
FIG. 5B presents a flowchart illustrating the process of a standby management unit initiating a failover based on a synchronized database, in accordance with an aspect of the present application.

FIG. 5B presents a flowchart illustrating the process of an SMU initiating a failover based on a synchronized database, in accordance with an aspect of the present application. During operation, the SMU can determine the unavailability of the AMU (operation 552) and indicate the database instance (i.e., the standby database) in the local memory segment (operation 554). The SMU can validate a respective memory block in the memory segment based on the local CRC journal (operation 506). The SMU can then determine whether all memory blocks are valid (operation 558).

If all memory blocks are not valid, the SMU can perform a recovery operation on the invalid memory blocks (operation 560). The SMU can determine whether the recovery is successful (operation 562). If all memory blocks are valid (operation 558) or the recovery is successful (operation 562), the SMU can initiate the operations of the SMU based on the local database instance (operation 564). On the other hand, if the recovery is not successful, the SMU can present an error message indicating an invalid database instance (operation 566).

Figure 6:
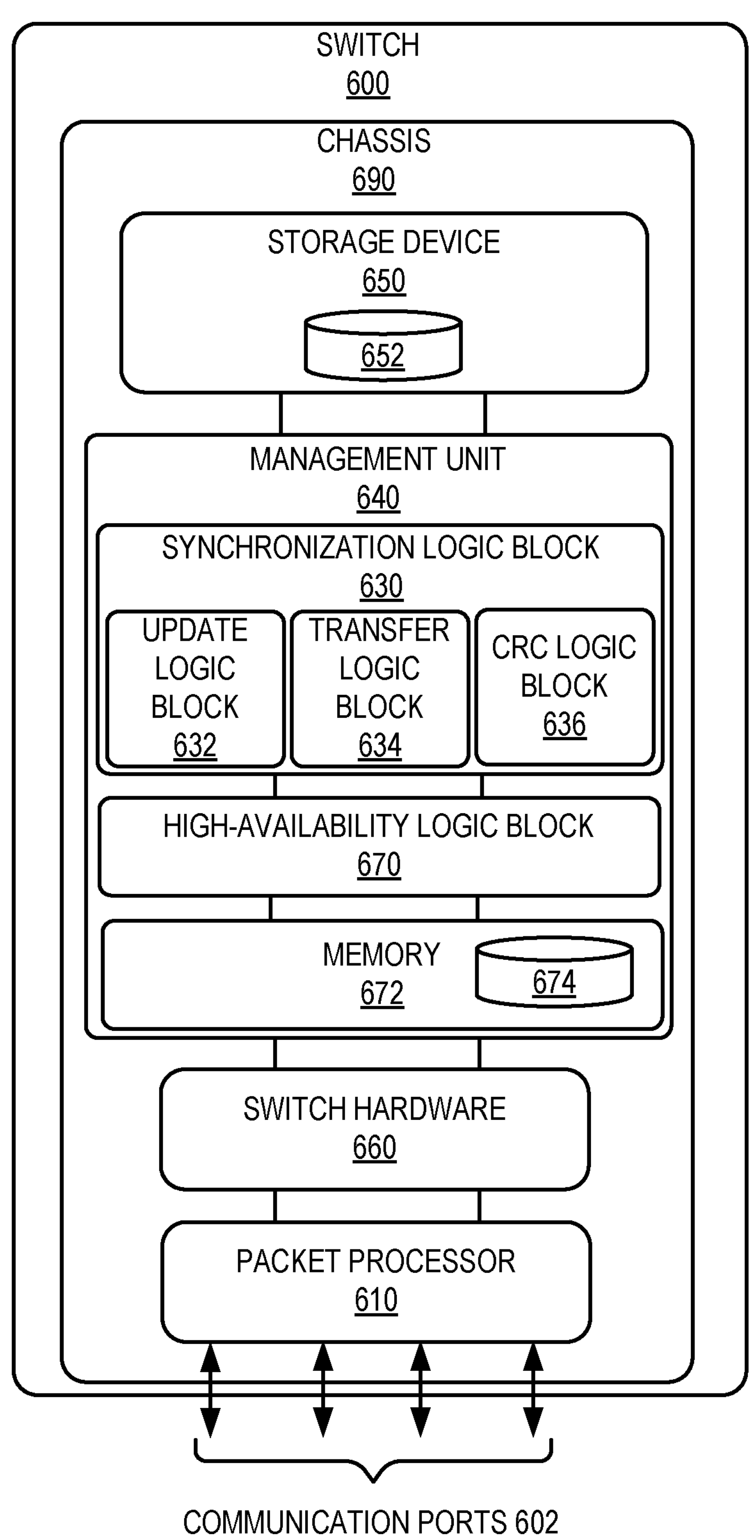
FIG. 6 illustrates an example of a switch comprising a high-availability chassis supporting memory-transfer-based database synchronization, in accordance with an aspect of the present application.

FIG. 6 illustrates an example of a switch comprising a high-availability chassis supporting memory-transfer-based database synchronization, in accordance with an aspect of the present application. Switch 600 can include a chassis 690 that can facilitate the backplane of switch 600. Switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include one or more management units, such as management unit 640. Management unit 640 can include a memory device 672 that can store a database 674, which can be a memkvs. Database 674 can be stored in a memory segment of memory device 672 outside of the accessible range of an operating system of management unit 640. Management unit 640 can include a high-availability logic block 670 that can facilitate failover to an AMU. Management unit 640 can include a synchronization logic block 630 that can facilitate memory-transfer-based synchronization of database 674.

Synchronization logic block 630 can include an update logic block 632, a transfer logic block 634, and a CRC logic block 636. Update logic block 632 can detect whether a memory block storing a portion of database 674 is updated. Transfer logic block 634 can represent the memory segment storing database 674 as a part of a flat memory structure. Transfer logic block 634 can also issue an instruction to copy an updated memory block of database 674 to a corresponding memory block in an SMU via an interconnect fabric of chassis 690. CRC logic block 636 can calculate a CRC value based on the content of the memory block and store it in an entry of a CRC journal. Transfer logic block 634 can then issue an instruction to copy the CRC value to a corresponding journal entry in an SMU via the interconnect fabric.

One aspect of the present technology can provide a system for memory-transfer-based database synchronization. During operation, the system can receive, from a database management application on an active unit of an appliance, a notification indicating that a first memory block has been updated due to an update to a first entry in a first database of the active unit. The first memory block can store the first entry in a first memory segment of a first memory device of the active unit. The system can identify a second memory block that stores a corresponding second entry in a second database of a standby unit of the appliance. The second memory block can be in a second memory segment of a second memory device of the standby unit. The first and second memory segments are outside of the accessible memory range of the operating systems of the active and standby units, respectively. The system can then replace the content of the second memory block with the content of the first memory block using a memory-transfer operation, thereby synchronizing the first and second entries bypassing the database management application.

In a variation on this aspect, the first and second memory segments can be presented as a unified flat memory space to the synchronization logic block.

In a variation on this aspect, the active and standby units can be housed in a chassis of the apparatus. The system can then include a processor of the chassis outside of the active and standby units.

In a variation on this aspect, the notification can be triggered in response to the completion of a transaction that updates the first entry. Here, the database management application determines that the first memory block is updated by the transaction.

In a variation on this aspect, the first and second entries can store the same state information for the active and secondary units, respectively. The state information can facilitate a failover from the active unit to the standby unit.

In a variation on this aspect, each of the first and second databases can be an in-memory key-value-store (memkvs).

In a variation on this aspect, the memory-transfer operation can include data replication from the first memory block to the second memory block using direct memory access (DMA).

In a further variation, the first and second units can be coupled via an interconnect fabric within an apparatus. The interconnect fabric can then support DMA-based data replication.

In a further variation, the memory-transfer operation can include storing the content of the first memory block in a buffer of the interconnect fabric.

In a variation on this aspect, the memory-transfer operation can include transferring a cyclic redundancy check (CRC) value from a first data structure of the active unit to a second data structure of the standby unit. Here, the CRC value is computed based on the content of the first memory block.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code, and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:

receiving, by an appliance from a database management application on an active unit of the appliance, a notification indicating that a first memory block has been updated due to an update to a first entry in a first database of the active unit, wherein the first memory block stores the first entry in a first memory segment of a first memory device of the active unit, and wherein the first memory segment is outside of an accessible memory range of a first operating system of the active unit;

identifying, by the appliance, a second memory block that stores a corresponding second entry in a second database of a standby unit of the appliance, wherein the second memory block is in a second memory segment of a second memory device of the standby unit, and wherein the second memory segment is outside of an accessible memory range of a second operating system of the standby unit; and replacing, by the appliance, content of the second memory block that is in the second memory segment outside of the accessible memory range of the second operating system with content of the first memory block that is in the first memory segment outside of the accessible memory range of the first operating system using a direct memory-transfer operation managed by a direct memory access (DMA) controller of the appliance independent of the first operating system and the second operating system to synchronize the first and second entries, wherein the direct memory-transfer operation further comprises transferring a cyclic redundancy check (CRC) value from a first data structure associated with the first database of the active unit to a second data structure associated with the second database of the standby unit, and wherein the CRC value is computed based on the content of the first memory block.

2. The method of claim 1, further comprising presenting, to the DMA controller of the appliance, the first and second memory segments as a unified flat memory space.

3. The method of claim 2, wherein the active and standby units are housed in a chassis of the appliance, and wherein the DMA controller comprises a processor of the chassis outside of the active and standby units.

4. The method of claim 1, wherein the notification is triggered in response to completion of a transaction that updates the first entry, and wherein the database management application determines that the first memory block is updated by the transaction.

5. The method of claim 1, wherein the first and second entries store same state information for the active and secondary units, respectively, and wherein the state information facilitates a failover from the active unit to the standby unit.

6. The method of claim 1, wherein each of the first and second databases is an in-memory key-value-store (memkvs).

7. The method of claim 1, wherein the direct memory-transfer operation further comprises data replication from the first memory block to the second memory block using DMA.

8. The method of claim 7, wherein the active and standby units are coupled via an interconnect fabric within the appliance, and wherein the interconnect fabric supports DMA-based data replication.

9. The method of claim 8, wherein the direct memory-transfer operation further comprises storing the content of the first memory block in a buffer of the interconnect fabric.

10. An apparatus, comprising:

a chassis;

an active unit comprising a first processor and a first memory device, and having a first operating system;

a standby unit facilitating high availability to the active unit, the standby unit comprising a second processor and a second memory device, and having a second operating system; and a memory controller comprising a direct memory access (DMA) controller, the memory controller to:

receive, from a database management application on the active unit, a notification indicating that a first memory block has been updated due to an update to a first entry in a first database of the active unit, wherein the first memory block stores the first entry in a first memory segment of the first memory device, and wherein the first memory segment is outside of an accessible memory range of the first operating system of the active unit;

identify a second memory block that stores a corresponding second entry in a second database of a standby unit, wherein the second memory block is in a second memory segment of the second memory device, and wherein the second memory segment is outside of an accessible memory range of the second operating system of the standby unit; and replace content of the second memory block that is in the second memory segment outside of the accessible memory range of the second operating system with content of the first memory block that is in the first memory segment outside of the accessible memory range of the first operating system using a direct memory-transfer operation managed by the DMA controller independent of the first operating system and the second operating system to synchronize the first and second entries, wherein the direct memory-transfer operation further comprises transferring a cyclic redundancy check (CRC) value from a first data structure associated with the first database of the active unit to a second data structure associated with the second database of the standby unit, and wherein the CRC value is computed based on the content of the first memory block.

11. The apparatus of claim 10, wherein the DMA controller is configured to determine the first and second memory segments as a unified flat memory space.

12. The apparatus of claim 11, wherein the DMA controller comprises a processor of the chassis outside of the active and standby units.

13. The apparatus of claim 10, wherein the notification is triggered in response to completion of a transaction that updates the first entry, and wherein the database management application determines that the first memory block is updated by the transaction.

14. The apparatus of claim 10, wherein the first and second entries store same state information for the active and secondary units, respectively, and wherein the state information facilitates a failover from the active unit to the standby unit.

15. The apparatus of claim 10, wherein each of the first and second databases is an in-memory key-value-store (memkvs).

16. The apparatus of claim 10, wherein the direct memory-transfer operation further comprises data replication from the first memory block to the second memory block using DMA via an interconnect fabric of the chassis.

17. The apparatus of claim 16, wherein the direct memory-transfer operation further comprises storing the content of the first memory block in a buffer of the interconnect fabric.

18. A non-transitory computer-readable storage medium storing instructions that when executed by a processor of an appliance cause the processor to perform a method, the method comprising:

receiving, by a memory controller of the appliance from a database management application on an active unit of the appliance, a notification indicating that a first memory block has been updated due to an update to a first entry in a first database of the active unit, wherein the first memory block stores the first entry in a first memory segment of a first memory device of the active unit, and wherein the first memory segment is outside of an accessible memory range of a first operating system of the active unit;

identifying, by the memory controller, a second memory block that stores a corresponding second entry in a second database of a standby unit of the appliance, wherein the second memory block is in a second memory segment of a second memory device of the standby unit, and wherein the second memory segment is outside of an accessible memory range of a second operating system of the standby unit; and replacing, by the memory controller, content of the second memory block with content of the first memory block using a direct memory-transfer operation to synchronize the first and second entries, wherein the direct memory-transfer operation further comprises transferring a cyclic redundancy check (CRC) value from a first data structure associated with the first database of the active unit to a second data structure associated with the second database of the standby unit, and wherein the CRC value is computed based on the content of the first memory block.

* * * * *